United States Patent [19]

Oehler

[11] Patent Number: 4,845,690

[45] Date of Patent: Jul. 4, 1989

[54] MULTIPLE SCREEN BALLISTIC CHRONOGRAPH

[76] Inventor: Kenneth L Oehler, P.O. Box 9135, Austin, Tex. 78766

[21] Appl. No.: 177,098

[22] Filed: Apr. 4, 1988

[51] Int. Cl.[4] ........................... G04P 8/00; G01P 3/42

[52] U.S. Cl. ..................................... 368/113; 364/565

[58] Field of Search ............. 368/1, 6, 9, 10, 113-118; 364/565, 569; 273/371-372

[56] References Cited

U.S. PATENT DOCUMENTS 4,305,142 12/1981 Springer ............................ 273/372
4,350,881 9/1982 Knight et al. ...................... 364/565
4,509,131 4/1985 Krasnjanski ........................ 364/565

*Primary Examiner*—Vit W. Miska
*Attorney, Agent, or Firm*—Walter C. Farley

[57] ABSTRACT

A chronograph system includes three shot-sensing screens which provide start and stop signals to interval-determining timers. The first screen provides a start signal to both timers and the subsequent screens provide stop signals to the first and second timers, respectively. The time intervals measured by these timers are divided into the distances between the screens to separately calculate two velocities based on two different distances. The calculated velocities are compared to evaluate the performance of the instrumentation so that measurement errors resulting from the instrumentation itself can be eliminated from analysis of the test shots.

4 Claims, 2 Drawing Sheets

MULTIPLE SCREEN BALLISTIC CHRONOGRAPH

This invention relates to a chronograph of the type used to measure ballistic characteristics of a projectile and, in particular, to an improved chronograph which is capable of indicating the possible existence of errors arising from errors generated in the measuring system itself.

BACKGROUND OF THE INVENTION

A chronograph is used to measure the average velocity of projectiles in a batch of test projectiles and also to indicate the dispersion of the velocity readings of the sample. It is commonly assumed that any measurement errors, i.e., errors introduced by the measurement system itself, are negligible compared to both the average velocity and to the dispersion. While the first assumption is usually justified, the second may not be.

Chronographs of the type under consideration herein are based on the well-known relationship that velocity of a projectile is equal to the distance traveled by the projectile divided by the time required to travel that distance. Systems such as those shown in U.S. Pat. Nos. 3,824,463; 4,128,761; and 4,239,962, all to the present inventor, illustrate devices for this purpose as they have been used in the past. The content of these patents is hereby incorporated by reference. As will be recognized from these patents, optical devices are preferred as the sensors for determining when the projectile passes through specific planes although inductive devices can be employed. The sensors, commonly referred to as "screens", are usually placed a few feet apart, perhaps ten feet, and the light perturbations detected by the photodetectors in these devices are supplied to timing circuits which respond to the interval between the pulses, and to a setting representative of the distance, to produce an output which quite accurately represents the velocity.

It is, of course, possible for errors to creep into the system. Some test procedures frequently require that two independent chronograph systems be used on each shot. One chronograph is commonly designated as "the primary" channel and the other is designated "secondary". The secondary chronograph verifies proper functioning of the primary system. Most chronograph errors are not errors in the time measuring circuits of the actual chronograph itself, but are usually errors contributed by the detecting devices (coils or screens) used to signal the passage of the projectile through the plane. If the two chronographs are independent, and if the detecting devices are physically spaced apart, it is very unlikely that the two velocity readings will agree when there is an error contributed by one or more of the detecting devices.

However, providing two entire systems is obviously a rather expensive and cumbersome solution to the problem. A major inconvenience is that the two systems, being independent, produce their own outputs which must then be manually compared in order to determine whether a problem exists. As a practical matter, this is generally done only after the entire shot sequence is completed and, if it turns out that there were errors, the statistical analysis of the results must be recomputed. The alternative would be to provide a supervisory system which receives the outputs of both independent systems but this, again, involves considerable cost and simply makes the operation more complex, introducing additional possibilities for error.

SUMMARY OF THE INVENTION

Accordingly, an object of the present invention is to provide an improved chronograph which is capable of indicating the possibility that an error has occurred while the shot sequence is still in progress, essentially on a "real time" basis so that erroneous data can be eliminated before statistical analysis is accomplished.

A further object is to provide such a system which is substantially no more complicated than the basic chronograph systems of the prior art, thereby reducing the likelihood of introducing additional sources of error.

Briefly described, the invention includes an apparatus for measuring the velocity of a projectile and for indicating the possibility of a measuring error comprising the combination of first, second and third projectile sensors each including means for sensing the passage of a projectile and for producing a substantially real-time pulse signal indicating that a projectile has passed through its associated plane. The sensors are supported so that their respective monitored planes occupy a predetermined spaced relationship along a linear path to be traversed by a projectile so that the projectile can pass through the planes associated with all three sensors and, normally, be sensed by each sensor. A first timing circuit is connected to receive the pulse signal output of a first pair of the sensors for determining the elapsed time between those pulse signals and dividing the predetermined spacing between the planes monitored by the first pair of sensors by the measured elapsed time to provide a first velocity calculation and an output representative of that calculation. A second timing circuit is connected to receive the pulse signal outputs of a different pair of the sensors for determining an elapsed time between the pulse signals of those sensors and performing a similar calculation to provide an output representative of a second velocity calculation. The first and second velocity calculations can be displayed and means is provided for comparing the first and second velocity calculations to provide an "alert" indication when the velocity calculations differ from each other by a predetermined amount, indicating the possibility of a system error.

Preferably, each pair of sensors includes the first sensor reached by the projectile.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification and wherein.

DESCRIPTION OF EMBODIMENT

Figure 1:
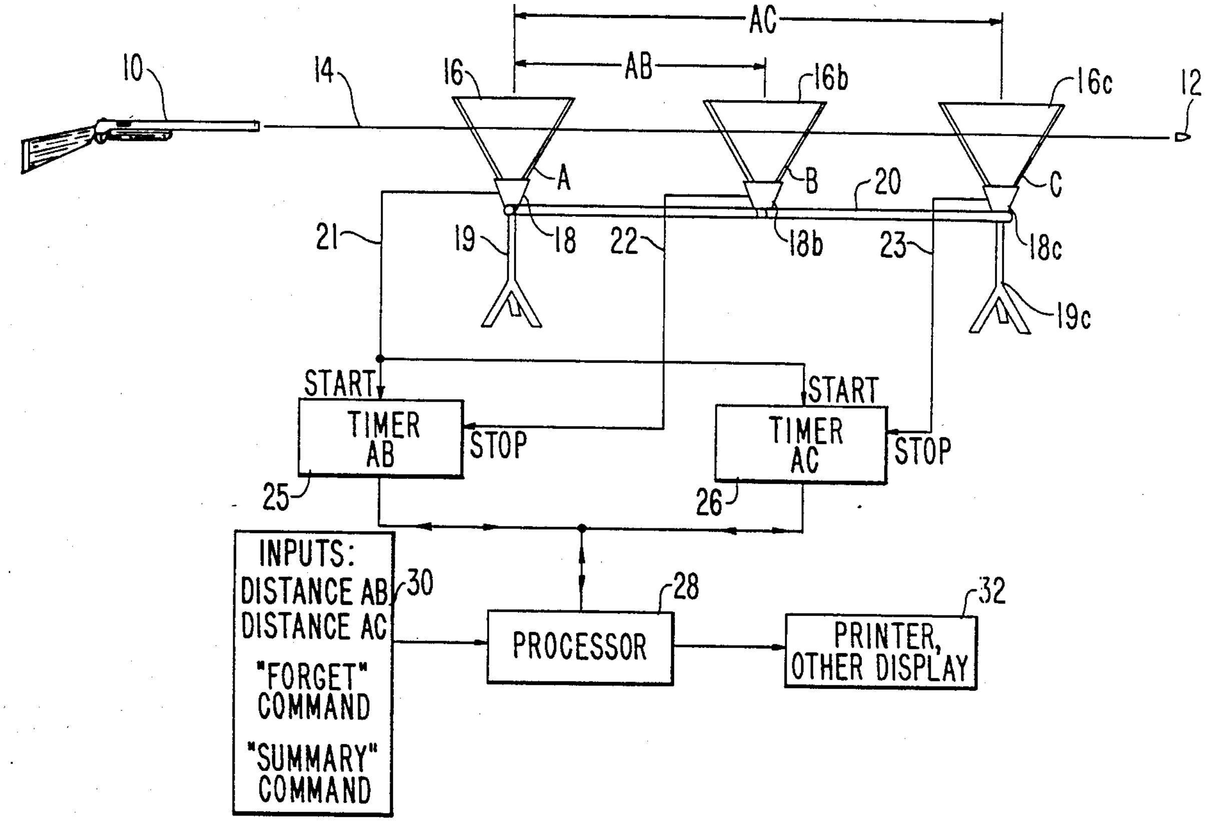
FIG. 1 is a schematic block diagram of a system in accordance with the present invention.

A schematic diagram of the overall arrangement of apparatus usable in connection with the subject invention is shown in FIG. 1 wherein a firearm, such as a rifle 10, is to be used to fire a projectile 12 which will follow a substantially straight path indicated by the line 14 insofar as the distances involved in this kind of measurement are concerned. The path 14 of projectile 12 passes successively through the openings of screens A, B and C which are supported along the path and are spaced apart by distances such that the transit time between screens A and B may be approximately equal to the transit time between screens B and C, but both of those distances are significantly different from the distance between screens A and C.

Each screen includes a generally triangular frame 16 defining the opening through which the projectile is to pass and a base housing 18, **18*b*, 18*c* which contains a photodetector having a photosensitive element facing upwardly toward the opening in the frame. Supports 19 and 19*c* of any convenient type can be provided to hold the end screens in their desired positions and bar 20 extends between those supports and holds middle screen 16*b*, 18*b*. With this arrangement, accurate and stable spacing between the screens is assured. As more fully described in the above-mentioned issued patents, the passage of a projectile through the plane containing the photodetector within frame 16 causes a momentary change in the amount of light received by the photodetector, whether that light is supplied by natural lighting out of doors or by an artificial source mounted on the frame or above all three frames. The photodetector responds by producing a relatively short electrical pulse indicating the passage of the projectile. Thus, as the projectile sequentially passes through the screens, pulses are produced by the photodetector in housing 18*a* of unit A on conductor 21, then by the photodetector in housing 18*b* on conductor 22, and, a short time later, by the photodetector in housing 18*c* on conductor 23**.

The signal produced on conductor 21 is connected to the "start" input terminals of timers 25 and 26 while the signals on conductors 22 and 23 are provided, respectively, to the "stop" input terminals of timers 25 and 26. Thus, the pulse from unit A starts both timers, the pulse from unit B stops timer 25 and the pulse from unit C stops timer 26.

Each timer circuit is essentially a bistable device which is switched to one state by the start pulse and switched to its other state by a stop pulse. Thus, the duration of the switched state between the start and stop pulses is a measure of the time required for the projectile to pass between the two screens associated with the units supplying the pulses to the timer.

Timers 25 and 26 are connected with a processor 28 which is a "one chip" microprocessor used as the controller for the instrument. The processor is provided with inputs, illustrated by block 30, including the measured distances AB and AC between screens A and B and between screens A and C. Other commands are also supplied as inputs, and these will be further described. The processor supplies outputs to a display which would normally include a printer and can also include other forms of display.

In accordance with the well-known relationship between velocity, distance and time, the distance AB which is measured and set into the processor is divided by the time interval measured by timer AB to produce a velocity which is provided as an output to display 32. Similarly, distance AC is divided by the time interval measured by timer 26 as a calculation of the velocity of the projectile as it passes between screens A and C, and this calculation is provided as an output to unit 32. In addition, the two velocity calculations are compared and, if they differ by a predetermine amount, a special "alert" signal is provided such as by printing a special symbol adjacent the printed output.

As will be recognized, if the system is set up and is working properly and if the measurements made between screens are accurate, the velocities determined for the distances AB and AC should be identical, assuming that the velocity does not change significantly along the path of travel from screen A to screen C. With distances between screens in the order of ten feet or so, this is a reasonably valid assumption.

However, if there is an error in one of the start or stop pulses, the measured velocities will not be the same but, rather, will differ as a function of the amount of the error. Thus, if the pulse from screen B were delayed, the time interval AB would be extended and the resulting velocity would be considerably lower than the proper velocity measured over the interval AC. If the two calculated velocities differ by more than the predetermined amount, the alert indication is given. From experience, the difference limit above which the alert signal will be given can reasonably be established in accordance with the relationship $(1+(0.01\ V/D))$ where V is the velocity in feet per second indicated by the primary channel AC and D is the sensor spacing (in feet) of the secondary channel AB. Channel AC is normally regarded as the primary channel because the measurement is made over a longer baseline and would therefore usually be more accurate.

Velocity AB could be made more precise by moving detector B until distance AB ia approximately the same as distance AC. However, the function of the secondary velocity measurement is not to increase precision but is to detect significant errors in the primary velocity measurement, or in either measurement. The fact that the baseline AB is significantly different from the baseline AC is therefore important. If, for example, detectors B and C were placed so that the distances AB and AC were substantially equal, a timing error in the signal from detector A would cause both systems to indicate nearly the same erroneous velocity, clearly an undesirable result.

Because velocity measurement errors are most often caused by errors in the detectors, this system combines the actual read-out and comparison function into a single unit using three detectors. The detectors are spaced at appropriate distances (such as the equal spacing described above) and a single instrument measures and displays both velocities to the user. Agreement between the velocities indicates proper functioning of the system and provides assurance to the user.

The alert can be in the form of a flashing indicator, blinking characters in a display, an audible signal, a special printed "flag" on a printed record, or some other appropriate signal. Triggering the alert can be based on determining the absolute difference between the two readings exceeding a threshold value, the threshold value being either a constant or a function of the velocity readings.

It is recognized that measurement errors will occur even though their probability of occurrence is small. It is critical in the analysis of test data to distinguish between deviations caused by differences between the test samples and deviations introduced by the instrumentation. The instrument of the present invention provides a clear indication that an error existed in either the primary or secondary measurement and, hence, the instrumentation would be suspect. Agreement between the primary and secondary measurements suggests that the measurements are accurate to the degree indicated by the magnitude of the difference.

Figure 2:
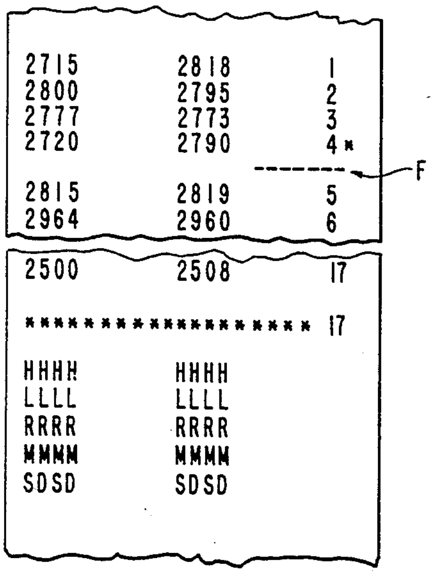
FIG. 2 is a representation of a typical printed display of data produced by the system of FIG. 1.

A typical printout is shown in FIG. 2 in which it is assumed, as an example, that the system is used to measure velocities of a typical 0.30–06 rifle cartridge and a paper tape is printed for the user. This typical tape might appear as shown in FIG. 2 wherein the first column (to the left) is a printout of the primary velocities for each shot (measured over the distance AC), the second column is a printout of the secondary velocities and the third column is simply a number indicating the number of the shot in the sequence. In this particular system, it will be assumed that an asterisk is the alert symbol and is printed after any shot number for which the velocity calculations differ by an amount exceeding the selected threshold. In the illustration, shot No. 4 is such a shot and it is likely that the operator of the system would choose to have the data from shot No. 4 eliminated from the analysis of the test run. This option is available by allowing the operator to simply depress a "forget" button, supplying a "forget" command to the computer which causes the data for the immediately preceding shot to be erased from memory and subsequently disregarded. An indication of the "forget" button is printed on the tape as indicated at F and the test is continued.

After the desired number of rounds has been fired, the operator gives a "summary" command to the processor whereupon the processor performs a number of conventional statistical analyses and prints the results on the printed display, these results in the example of FIG. 2 constituting the highest velocity measured by each of the primary and secondary channels, the lowest such velocities measured, the range of velocities encountered in this test run by each channel, the average or mean velocities in each channel and the standard deviation.

Figure 3:
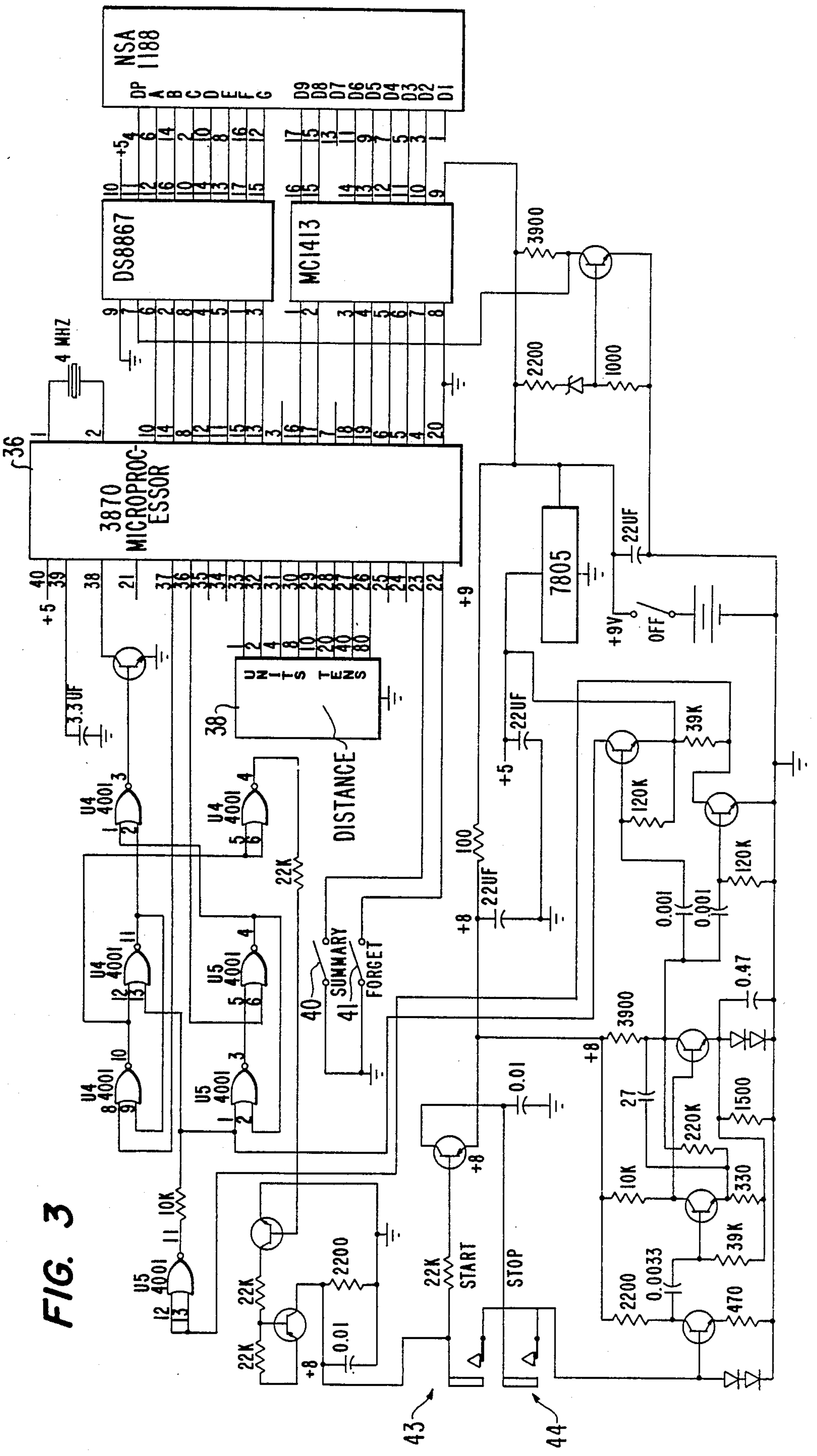
FIG. 3 is a more detailed schematic diagram of one channel of a circuit usable in the system of FIG. 1.

A more detailed schematic diagram of one channel of the circuitry is shown in FIG. 3 wherein the one-chip processor 36 is shown as a 3870 microprocessor. A distance unit 38 is used to set the distances between screens into the microprocessor memory. "Summary" and "forget" commands are given by simply closing switches 40 or 41 which provide suitable commands to inputs 23 or 22 of the processor.

The start and stop inputs connectable to the outputs of detectors 18 are shown as standard telephone jacks 43 and 44.

When the system is connected together and energized, the processor first initializes its statistical parameters and then commences a delay for the purpose of allowing the automatic gain controls of the sensors A, B and C to stabilize. The counters 25 and 26 are then given enable signals, permitting them to respond to start and stop signals. They then wait until a start time signal is received from the photodetector associated with screen A.

As shots are made and signals are received, the times are transferred to the computer and recorded after stop signals are received. Any previous valid round is included in the intermediate statistical computations unless a "forget" signal was entered relating to the previous shot. The primary and secondary velocities are computed and also the absolute difference between the velocities. The allowable difference is computed based on primary velocity, sensor spacing and other parameters which have been selected. The observed difference is compared with the allowable difference and the alert flag is set, if required. The velocities are displayed and/or printed with the warning to the operator if the observed velocities differ significantly. The process then returns to the step of enabling the counters and waiting for the first "start" signal.

If the summary button is depressed, the system includes the results from all previous rounds unless "forget" signals have been provided, and calculates and displays statistics from all "not forgotten" shots. The summary is then printed and the system returns to the step of enabling the counters.

It will be recognized that it would be possible to use four or even more screens to accomplished the same purpose as the three-screen embodiment disclosed herein. It might be necessary to provide different connections for the electronic circuits, depending upon the selection of screens used for the timing pulses. For example, if four screens A, B, C, and D were used and if screens AC and BD were chosen to provide timing pulses, it would be necessary to connect the photodetectors of screens A and C to the start and stop inputs of one timer and of screens B and D to those inputs of the second timer. The principles, however, remain the same.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for measuring the velocity of a projectile and for indicating the possibility of an instrument-generated measuring error comprising the combination of a plurality of more than two projectile sensors each including means for sensing the passage of a projectile through a monitored plane and for producing a substantially real-time pulse signal indicating that a projectile has passed;

means for supporting said sensors with their respective monitored planes occupying a predetermined spaced relationship along a linear path to be traversed by a projectile so that the projectile can pass through the planes associated with all three sensors and normally be sensed by each said sensor;

first timing circuit means connected to receive the pulse signal outputs of a first pair of said sensors for determining the first elapsed time between the pulse signals and dividing said predetermined spacing between the planes monitored by said first pair of sensors by said first elapsed time to provide a first velocity calculation, and for providing an output representative of said first velocity calculation;

second timing circuit means connected to receive the pulse signal outputs of a second, different pair of said sensors for determining a second elapsed time between said pulse signals and dividing said predetermined spacing between the planes monitored by said second pair of sensors by said second elapsed time to provide a second velocity calculation and for providing an output representative of said second velocity calculation;

means for displaying said first and second velocity calculations; and means for comparing said first and second velocity calculations and for providing an "alert" indication when said velocity calculations differ from each other by a predetermined amount.

2. An apparatus according to claim 1, wherein one of the sensors in each of said first and second pairs is the first sensor reached by said projectile.

3. An apparatus according to claim 1 wherein the number of sensors is three.

4. A method for measuring the velocity of a projectile and for indicating the possibility of a measuring error comprising the combination of supporting a plurality of more than two projectile sensors so that their respective monitored planes occupy a predetermined spaced relationship along a linear path to be traversed by a projectile and so that the projectile can pass through the planes associated with all of the sensors and normally be sensed by each of the sensors, each sensor including means for sensing the passage of a projectile through a monitored plane and for producing a substantially real-time pulse signal indicating that a projectile has passed;

combining the pulse signal outputs of a first pair of the sensors for determining the first elapsed time between the pulse signals, dividing the predetermined spacing between the planes monitored by the first pair of sensors by the first elapsed time to provide a first velocity calculation and providing an output representative of the first velocity calculation;

combining the pulse signal outputs of a second, different pair of the sensors for determining a second elapsed time between the pulse signals, dividing the predetermined spacing between the planes monitored by the second pair of sensors by the second elapsed time to provide a second velocity calculation, and providing an output representative of the second velocity calculation;

displaying the first and second velocity calculations;

comparing first and second velocity calculations, and providing an "alert" indication when the velocity calculations differ from each other by a predetermined amount.

* * * * *